United States Patent
Radwainski

(10) Patent No.: US 9,948,161 B2
(45) Date of Patent: Apr. 17, 2018

(54) ROTOR ASSEMBLY FOR AN ELECTRIC MACHINE AND METHOD FOR PRODUCING A ROTOR ASSEMBLY

(71) Applicant: Continental Automotive GmbH, Hannover (DE)

(72) Inventor: Matti Radwainski, Berlin (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 354 days.

(21) Appl. No.: 14/435,916

(22) PCT Filed: Oct. 14, 2013

(86) PCT No.: PCT/EP2013/071395
§ 371 (c)(1),
(2) Date: Aug. 24, 2015

(87) PCT Pub. No.: WO2014/060339
PCT Pub. Date: Apr. 24, 2014

(65) Prior Publication Data
US 2015/0357879 A1 Dec. 10, 2015

(30) Foreign Application Priority Data
Oct. 15, 2012 (DE) .................. 10 2012 218 716

(51) Int. Cl.
*H02K 7/04* (2006.01)
*H02K 15/16* (2006.01)

(52) U.S. Cl.
CPC ............ *H02K 7/04* (2013.01); *H02K 15/165* (2013.01)

(58) Field of Classification Search
CPC .................. H02K 7/04; H02K 15/165
(Continued)

(56) References Cited

U.S. PATENT DOCUMENTS 4,644,201 A * 2/1987 Tani .................. F16F 15/32
310/216.004
6,917,137 B2 7/2005 Okamoto et al. .......... 310/261.1
(Continued)

FOREIGN PATENT DOCUMENTS

DE 60301997 T2 4/2006 ............. F16F 15/32
DE 102009047619 A1 6/2011 ............. H02K 1/27
(Continued)

OTHER PUBLICATIONS

Chinese Office Action, Application No. 201380053899.7, 15 pages, dated Aug. 15, 2016.
(Continued)

*Primary Examiner* — Alex W Mok
(74) *Attorney, Agent, or Firm* — Slayden Grubert Beard PLLC

(57) ABSTRACT

A rotor assembly for an electric machine includes a rotor having an axis of rotation extending in an axial direction of the rotor and at least one first hole extending parallel to the axis of rotation and radially spaced from the axis of rotation by a first radial distance, and at least one first balancing element for compensating an unbalance of the rotor in rotation about the axis of rotation. The at least one first balancing element can be provided in the at least one first hole and can be fastened in the at least one first hole by means of a press fitting connection between the at least one first hole and the at least one first balancing element. Thus, a simple and economical possibility of balancing the rotor is provided.

17 Claims, 5 Drawing Sheets

(58) Field of Classification Search
USPC .......................................................... 310/51
See application file for complete search history.

(56) References Cited

U.S. PATENT DOCUMENTS

| | | | | |
|---|---|---|---|---|
| 8,405,269 B2 * | 3/2013 | Spaggiari | ............... | H02K 1/276 |
| | | | | 310/156.45 |
| 2009/0115281 A1 | 5/2009 | Kimura et al. | ........ | 310/216.053 |
| 2011/0074240 A1 | 3/2011 | Hiramatsu et al. | ........... | 310/211 |

FOREIGN PATENT DOCUMENTS

| | | | | |
|---|---|---|---|---|
| EP | 0168055 A2 | 1/1986 | ............. | F16F 15/32 |
| JP | 4344153 A | 11/1992 | ............. | H02K 1/32 |
| JP | 9308152 A | 11/1997 | ............. | H02K 1/22 |
| JP | 2002010588 A | 1/2002 | ............. | F16F 15/32 |
| JP | 2004297882 A | 10/2004 | ............. | H02K 15/16 |
| WO | 2014/060339 A2 | 4/2014 | ............. | H02K 15/16 |

OTHER PUBLICATIONS

International Search Report and Written Opinion, Application No. PCT/EP2013/071395, 17 pages, dated Jul. 22, 2014.

\* cited by examiner

ROTOR ASSEMBLY FOR AN ELECTRIC MACHINE AND METHOD FOR PRODUCING A ROTOR ASSEMBLY

CROSS-REFERENCE TO RELATED APPLICATIONS

This application is a U.S. National Stage Application of International Application No. PCT/EP2013/071395 filed Oct. 14, 2013, which designates the United States of America, and claims priority to DE Application No. 10 2012 218 716.2 filed Oct. 15, 2012, the contents of which are hereby incorporated by reference in their entirety.

TECHNICAL FIELD

The present invention relates to a rotor assembly for an electric machine, or an electric motor, and to a method for producing a rotor assembly. In addition, the invention comprises an electric machine having such a rotor assembly.

BACKGROUND

An electric machine, e.g., an electric machine for driving a hybrid vehicle or electric vehicle, generally has a rotor which during the operation of the electric machine can frequently be accelerated above a rotational speed of 15,000 rpm (revolutions per minute).

If a rotor which is rotating at such a speed has an unbalance, specifically if the mass of the rotor has an asymmetry about the rotational axis of the rotor, this can lead to undesired vibrations and increased wear on the electric machine.

In such an electric machine it is therefore absolutely necessary to perform balancing of the rotor in order to reduce or avoid vibrations or wear on the electric machine.

It would be conceivable to balance the rotor by selectively removing or adding weight material from or to the rotor, in a similar way to how balancing of a car tire is carried out by adding the balancing weights to the rim.

Alternatively, selective removal of weight material from the rotor can be carried out by selective milling or drilling. It proves disadvantageous with such a solution for balancing the rotor that the rotor has to be provided in advance with the additional weight material for later selective removal, which gives rise overall to a relatively heavy weight of the rotor and therefore also to relatively high moments of inertia on the electric machine.

An alternative conceivable solution for balancing the rotor by selectively adding weight material, such as for example by applying balancing pastes to the rotor, is very difficult to implement and also costly with a standard or automated fabrication process.

SUMMARY

One embodiment provides a rotor assembly for an electric machine which has the following features: a rotor having a rotational axis which extends in an axial direction of the rotor and at least one first cutout which extends parallel to the rotational axis and is arranged radially spaced apart from the rotational axis by a first radial distance; at least one first balancing element for compensating for an unbalance of the rotor during rotation about the rotational axis; and wherein the at least one first balancing element can be provided in the at least one first cutout and can be attached in the at least one first cutout by means of a press fitting connection between the at least one first cutout and the at least one first balancing element.

In a further embodiment, the rotor also has at least one second cutout which extends parallel to the rotational axis and is arranged radially spaced apart from the rotational axis by a second radial distance which differs from the first radial distance, in order to receive and to attach a second balancing element for compensating for an unbalance of the rotor during rotation about the rotational axis.

In a further embodiment, the at least one first cutout and the at least one second cutout are arranged with a radial angle offset in relation to one another in the rotational direction with respect to the rotational axis.

In a further embodiment, the at least one first cutout and/or the at least one second cutout have a cross-sectional surface which comprises in its geometry at least two internal corners each with an internal angle, wherein angle lines of symmetry of all the internal angles intersect at a point.

In a further embodiment, the cross-sectional surface has in its geometry a polygon with at least three sides and at least three internal corners each with an internal angle.

In a further embodiment, the cross-sectional surface has in its geometry a polygon with equally long sides and equally large internal angles.

In a further embodiment, the cross-sectional surface has in its geometry at least two arcuate curves which connect the internal corners to one another.

In a further embodiment, the cross-sectional surface has on at least one of the internal corners a corner rounded portion for reducing the notch stress at the at least one first cutout and/or the at least one second cutout.

In a further embodiment, the rotor has a rotor laminated stack comprising a plurality of punched rotor sheet-metal disks, wherein at least one rotor sheet-metal disk has a punched hole which forms the at least one first cutout.

Another embodiment provides an electric machine having a rotor assembly as disclosed above.

Another embodiment provides a method for producing a rotor assembly, wherein the method comprises the following method steps: making available a plurality of similar sheet-metal disks each with a center of gravity; cutting out at least one hole in at least one sheet-metal disk spaced radially apart from the center of gravity; and assembling the congruent sheet-metal disks to form a rotor in such a way that by means of the respective holes at least one cutout is formed for receiving at least one balancing element for compensating for the unbalance of the rotor and for attaching the at least one balancing element by means of a press fitting connection between the at least one cutout and the at least one balancing element.

In a further embodiment, the method further includes pressing in of at least one balancing element into the at least one cutout in order to compensate the unbalance of the rotor in such a way that a press fitting connection comes about between the at least one cutout and the at least one balancing element.

BRIEF DESCRIPTION OF THE DRAWINGS

Example embodiments of the invention are discussed in detail below with reference to the drawings, in which.

DETAILED DESCRIPTION

Figure 1:
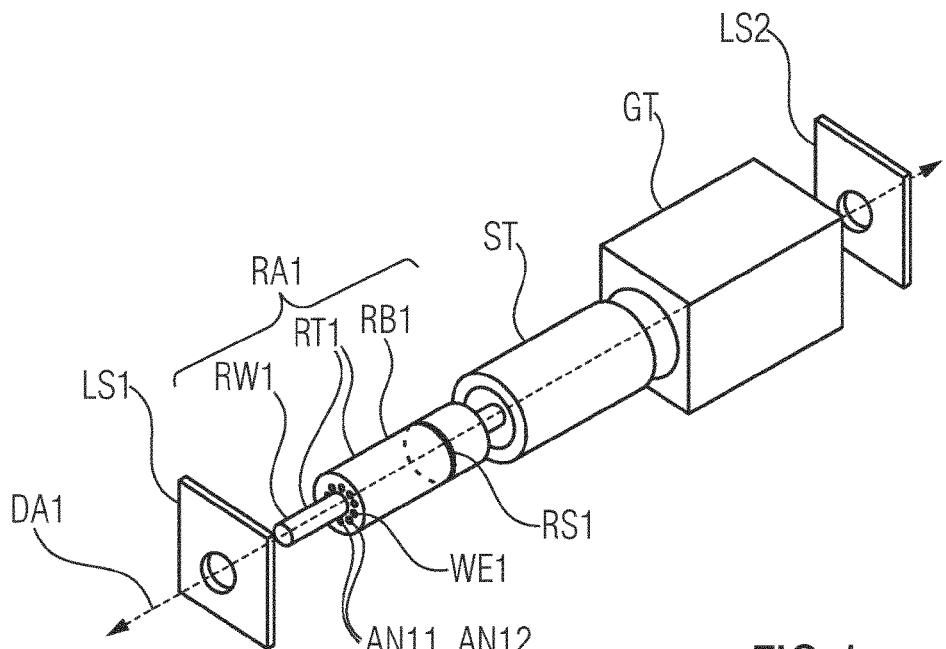
FIG. 1 shows a schematic exploded illustration of an electric machine for explaining the electric machine including a rotor assembly according to a first embodiment of the invention.

Embodiments of the invention provide a simple and cost-effective way of balancing a rotor of an electric machine.

Some embodiments provide a rotor assembly for an electric machine, in particular an electric machine for driving a hybrid vehicle or electric vehicle.

This rotor assembly may comprise:
a rotor having a rotational axis which extends in an axial direction of the rotor and at least one first cutout which extends parallel to the rotational axis and is arranged radially spaced apart from the rotational axis by a first radial distance, and
at least one first balancing element for compensating for an unbalance of the rotor during rotation about the rotational axis, that is to say for compensating for a non-symmetrical distribution of the mass of the rotor about the rotational axis of the rotor.

In this context, the at least one first balancing element can be provided in the at least one first cutout and can be attached in the at least one first cutout by means of a press fitting connection between the at least one first cutout and the at least one first balancing element.

Here, the "spaced-apart" arrangement of the specified cutout from the rotational axis means an arrangement with a spatial distance between the rotational axis and the cutout with spacing, with the result that the rotational axis and the cutout do not intersect.

As a result of the fact that both the cutouts and the balancing elements can be produced per se in standardized fabrication processes and the attachment of the balancing elements in the cutouts is carried out by means of a simple press fitting connection, a rotor assembly can be made available with a rotor which is balanced in a simple and cost-effective way. Through the pre-shaped cutouts it is additionally possible to achieve a saving in weight of the rotor and to reduce the material costs for the rotor. Furthermore, an electric machine with the rotor assembly having the pre-shaped cutouts has comparatively low moments of inertia.

Standardized and therefore cost-effective cylindrical pins with a, in particular, circular cross section can advantageously be used here as balancing elements, it being possible to press said pins selectively into the corresponding cutouts on the rotor in order to balance the rotor. The circular cross section of the cylindrical balancing elements facilitates the handling of the balancing elements during mounting, or during the pressing of the balancing elements into the cutouts, since said balancing elements can be introduced into the cutouts and pressed in at any radial angle (with respect to the pressing direction).

According to one embodiment, the rotor has at least one second cutout which extends parallel to the rotational axis and is arranged radially spaced apart from the rotational axis by a second radial distance which differs from the first radial distance, in order to receive and to attach a second balancing element for compensating for an unbalance of the rotor during rotation about the rotational axis. In this context, the first and the second cutouts have, for example, different cross-sectional shapes or different cross-sectional surfaces.

According to a further embodiment, the at least one first cutout and the at least one second cutout are arranged with a radial angle offset to one another in the rotational direction with respect to the rotational axis. The at least one first cutout and the at least one second cutout are therefore arranged with an angle offset in relation to one another with respect to a rotation about the rotational axis.

The two last-mentioned preferred refinements provide the advantage that an unbalance of the rotor can be balanced even more precisely by arranging balancing elements in the different shaped cutouts which have a radial offset from one another and different radial distances from the rotational axis.

According to yet a further embodiment, the at least one first cutout and/or the at least one second cutout have a cross-sectional surface which comprises in its geometry at least two internal corners each with an internal angle, wherein angle lines of symmetry of all the internal angles intersect at a point. Such a cross-sectional area or cross-sectional shape provides a better press fitting connection between a cutout and a balancing element which is arranged in this cutout.

According to a further embodiment, the cross-sectional surface of the at least one first cutout and/or of the at least one second cutout has in its geometry a polygon with at least three sides and at least three internal corners, each with an internal angle. In this context, the angle lines of symmetry of all the internal angles of the polygon advantageously intersect at a point.

According to a further embodiment, the cross-sectional surface has, perpendicularly with respect to the rotational axis of the rotor arrangement in its geometry, a polygon with equally long sides and equally large internal angles.

According to yet a further embodiment, the cross-sectional surface has, perpendicularly with respect to the rotational axis of the rotor assembly in its geometry, at least two arcuate curves which connect the internal corners to one another. In this context, the at least two arcuate curves advantageously form two outwardly curving arcs whose ends are connected in pairs. The angle lines of symmetry of the internal angles of the two internal corners advantageously intersect at one point.

The last-mentioned three embodiments provide different cross-sectional surfaces or cross-sectional shapes of the cutout which can be used in combination in a rotor assembly to achieve more precise balancing of the rotor.

According to a further embodiment, the cross-sectional surface has, perpendicularly with respect to the rotational axis of the rotor assembly, on at least one of the internal corners, a corner rounded portion for reducing the notch stress at the at least one first cutout and/or the at least one second cutout.

According to yet a further embodiment, the rotor has a rotor laminated stack comprising a plurality of punched rotor sheet-metal disks, wherein at least one rotor sheet-metal disk has at least one punched-out hole. After the congruent rotor sheet-metal disks with punched-out holes have been assembled, these holes form the at least one first cutout. As a result, the cutouts can be produced easily and only with negligible additional costs at the actual manufacture of the rotor sheet-metal disks by punching out corresponding holes from the rotor sheet-metal disks.

Other embodiments provide an electric machine having a rotor assembly as described above is made available.

Still other embodiments provide a method for producing a rotor assembly having the following illustrated method steps. Accordingly, a plurality of similar sheet-metal disks, each with a center of gravity, are made available. In this context, the sheet-metal disks are largely embodied with the same shape and preferably have the respective centers of gravity at the same locations on the sheet-metal disks. At least one hole is cut out on at least one sheet-metal disk, radially spaced apart from the center of gravity of the at least one sheet-metal disk. A plurality of holes are advantageously cut out in a plurality of sheet-metal disks, spaced radially apart from the center of gravity of the respective sheet-metal disk. The sheet-metal disks which are provided with holes (and also those which are not provided with holes) are assembled congruently and form a rotor in such a way that by means of the respective holes at least one cutout for receiving at least one balancing element for compensating for the unbalance of the rotor and for attaching the at least one balancing element by means of a press fitting connection between the at least one cutout and the at least one balancing element is formed.

According to one embodiment, at least one balancing element is pressed into the at least one cutout in order to compensate for the unbalance of the rotor in such a way that a press fitting connection comes about between the at least one cutout and the at least one balancing element.

As a result, a method is provided with which a rotor assembly or a rotor of a rotor assembly can be balanced easily and cost-effectively.

Advantageous aspects and embodiment of the rotor assembly which are illustrated above are to be considered, in so far as they can also be transferred to the abovementioned electric machine or the abovementioned method, as advantageous refinements of the electric machine or of the method.

FIG. 1 shows an electric machine EM according to a first embodiment of the invention in a simplified and schematic form in an exploded illustration, said embodiment serving, for example, as a drive of a hybrid vehicle or electric vehicle.

The electric machine EM comprises a housing part GT for receiving a stator ST, the stator ST, a rotor assembly RA1 together with a rotor shaft RW1, and a first and second end plate LS1 and LS2 for supporting and securing the rotor shaft RW1. In a completely mounted state of the electric machine EM, the housing part GT surrounds the stator ST completely and secures it fixedly in terms of movement. The stator ST is of cylindrical design and has a cavity in which the rotor assembly RA1 in which in the completely mounted state of the electric machine EM is supported rotatably and coaxially with respect to the stator ST.

The electric machine EM or the rotor assembly RA1 has a rotational axis DA1 about which the rotor assembly RA1 rotates during operation of the electric machine EM and thereby drives a driveshaft of the vehicle which is mechanically coupled to the rotor shaft RW1 in order to transmit torque and is not illustrated in more detail in the figure.

The rotor assembly RA1 comprises not only the rotor shaft RW1 but also a rotor laminated stack RB1 which is of cylindrical design and extends in the direction of the rotational axis DA1. In the completely mounted state of the electric machine EM, the rotor shaft RW1 and the rotor laminated stack RB1 together form the rotor RT1. The rotor laminated stack RB1 has a plurality of cutouts AN11 and AN12 which extend parallel to the rotational axis DA1 of the rotor assembly RA1 and are arranged to be distributed uniformly about the rotational axis DA1. These cutouts AN11 and AN12 serve primarily to receive balancing elements WE1 and therefore to compensate for the possibly present unbalance of the rotor RT1. In addition, these cutouts AN11 and AN12 serve to reduce the weight of the rotor assembly RA1 and therefore to reduce moments of inertia of the electric machine EM. In one of the cutouts AN11 and AN12 the rotor assembly RA1 has a balancing element WE1 for compensating for the unbalance of the rotor RT1.

Figure 2:
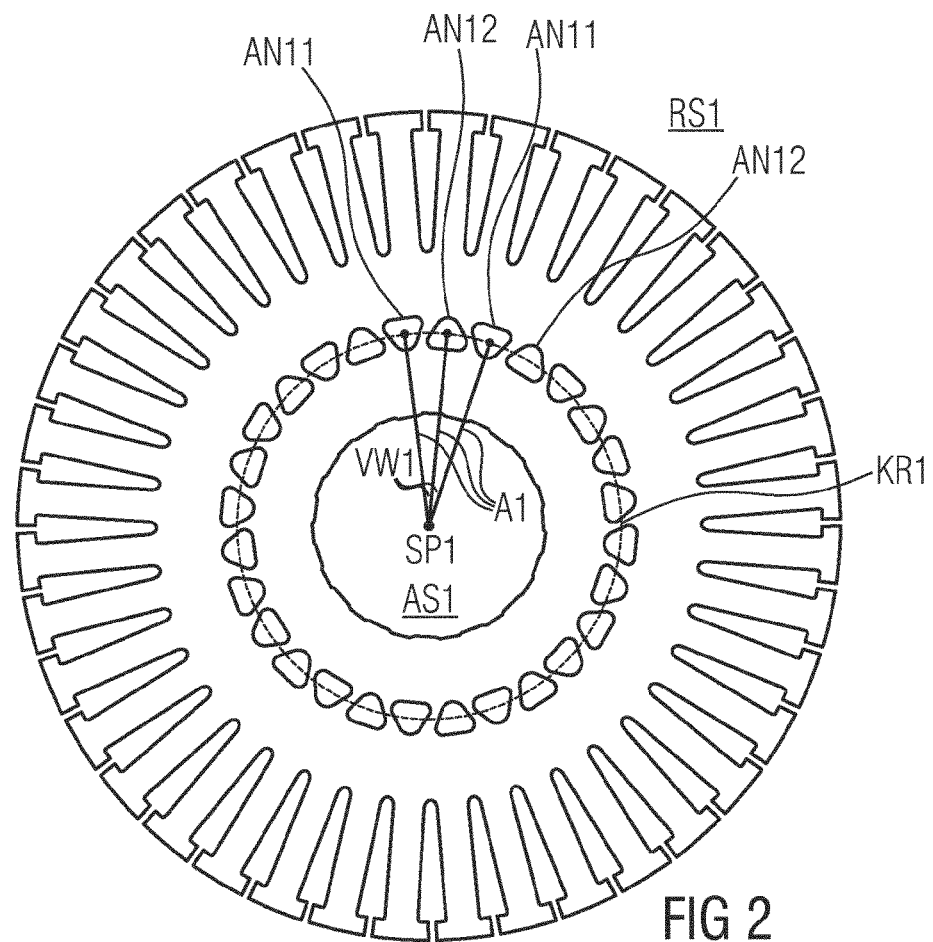
FIG. 2 shows a schematic illustration of a rotor disk of the rotor assembly according to the first embodiment of the invention in a plan view.

The rotor laminated stack RB1 comprises a plurality of thin rotor sheet-metal disks RS1 which are arranged one behind the other along the rotational axis DA1. A rotor sheet-metal disk RS1 of this type is shown in more detail in FIG. 2. Accordingly, the rotor sheet-metal disk RS1 is embodied as a circular sheet-metal disk with a geometric center of gravity SP1 as a center point, and has in the circular center about the center of gravity SP1 a circular cutout AS1 for receiving the rotor shaft RW1. After the assembly of the latter and a plurality of further similar rotor sheet-metal disks RS1 to form the rotor laminated stack RB1, these cutouts AS1 of the rotor sheet-metal disks RS1 form a continuous hole into which the rotor shaft RW1 is inserted and secured in a rotationally fixed fashion.

Radially spaced apart from the center of gravity SP1 and outside the region of the cutout AS1, the rotor sheet-metal disk RS1 has a plurality of cutouts AN11 and AN12 which are each at an equal radial distance A1 from the center of gravity SP1 of the rotor sheet-metal disk RS1 and have, considered perpendicularly with respect to the rotational axis DA1, a uniform, triangular cross-sectional surface QF1 which is rounded at the corners. As a result of the equal radial distance A1 from the center of gravity SP1, the geometric centers of gravity of all the cutouts AN11 and AN12 lie on a virtual circuit KR1 with the center of gravity SP1 as the center point of the circle and with a radius of A1. In this context, the cutouts AN11 and AN12 form a first group of first cutouts AN11 and a second group of second cutouts AN12, wherein the first cutouts AN11 of the first group and the second cutouts AN12 of the second group are arranged, considered from the center of gravity SP1 of the rotor sheet-metal disk RS1 in the radial viewing directions, at equal distances from one another, alternately reflected in relation to one another, perpendicularly with respect to the viewing direction. As a result, the adjacent cutouts AN11, AN12 have an equal radial offset angle VW1 with respect to one another as pairs, considered radially from the center of gravity SP1.

Figure 3:
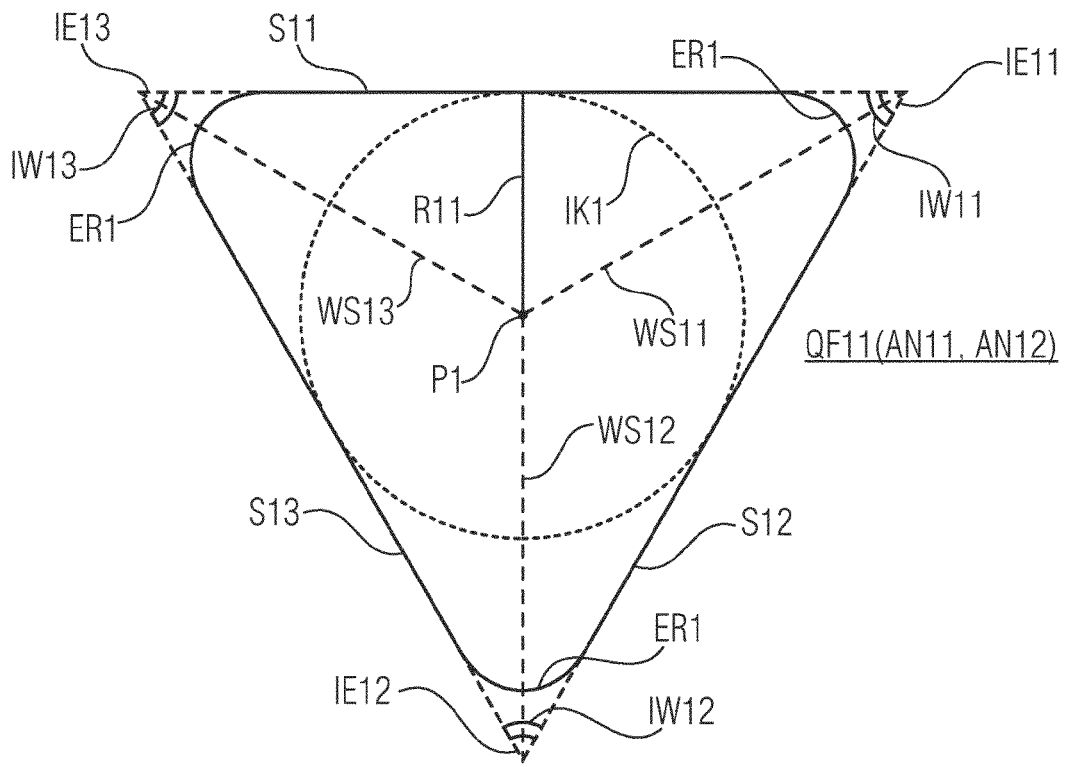
FIG. 3 shows a schematic illustration of a cross section of a cutout of the rotor assembly according to the first embodiment of the invention, perpendicularly with respect to the rotational axis of the rotor assembly.

One of the cutouts AN11, AN12 is illustrated in detail in FIG. 3. Accordingly, the cutouts AN11, AN12 have a uniform cross-sectional surface QF11 in the form of an equilateral triangle with corner rounded portions ER1. The cross-sectional surface QF11 of the cutouts AN11, AN12 therefore has an equilateral triangle with three equally long sides S11, S12 and S13 as well as three internal corners IE11, IE12 and IE13, each with an equally large internal angle IW11, IW12 and IW13. In this context, the three internal corners IE11, IE12 and IE13 are rounded by means of respective corner rounded portions ER1. Owing to the shape of the equilateral triangle, angle lines of symmetry (that is to say angle bisectors) WS11, WS12 and WS13 of the three equally large internal angles IW11, IW12 and IW13 intersect at a point P1 which is at the same time the geometric center of gravity of the cross-sectional surface QF11 of the cutouts AN11 and AN12. Considered in mathematical terms, the cross-sectional surface QF11 therefore has an in-circle IK1 with a radius of R11, which is at the same the shortest distance from the point P1 to each of the three sides S11, S12 and S13 of the cross-sectional surface QF11.

Figure 4:
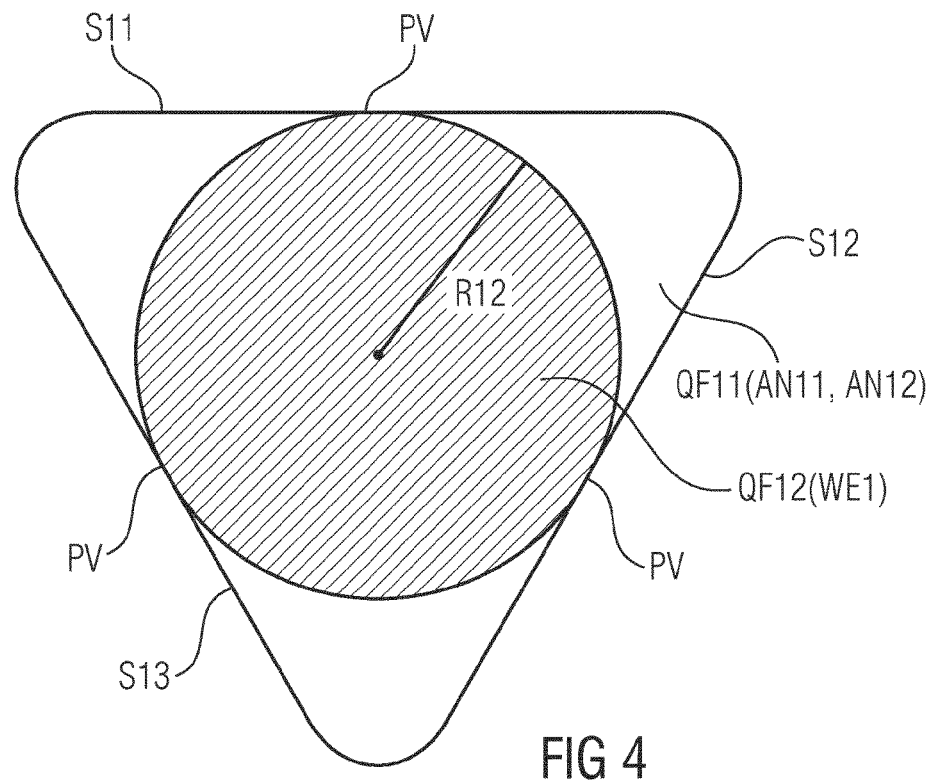
FIG. 4 shows a schematic illustration of a cross section of the cutout according to the first embodiment of the invention having a pressed-in balancing element, perpendicularly with respect to the rotational axis of the rotor assembly.

In order to compensate for the unbalance of the rotor RT1, balancing elements WE1 are pressed into one or more of the cutouts AN11 and AN12 in accordance with the position and severity of the unbalance. For example, as a cross-sectional illustration of one of the cutouts AN11 and AN12 with a pressed-in balancing element WE1 in FIG. 4 shows, the cylindrical balancing element WE1 has a circular cross-sectional surface QF12 with a radius of R12, wherein the radius R12 of the cross-sectional surface QF12 of the balancing element WE1 is a little larger, advantageously by one to several millimeters, than the radius R11 of the cross-sectional surface QF11 of the cutouts AN11, AN12, with the result that when the balancing element WE1 is pressed into the cutout AN11, AN12 the balancing element WE1 deforms elastically or elastoplastically. As a result of the deformation of the balancing element WE1, stable frictionally locking press fitting connections PV come about at the locations of line contact or surface contact between the balancing element WE1 and the cutout AN11, AN12 which hold the balancing element WE1 fixedly in terms of movement in the cutout AN11, AN12. As a result of the line contact or surface contact, a free space is produced between the balancing element WE1 and the cutout AN11 which receives this balancing element WE1, into which free space the excess material of the balancing element WE1, which is expelled by the deformation of the balancing element WE1 owing to the press fitting connection PV, can flow. Such a press fitting connection PV also permits the fabrication tolerances between the balancing elements WE1 and the cutouts AN11, AN12 to be compensated for.

Figure 5:
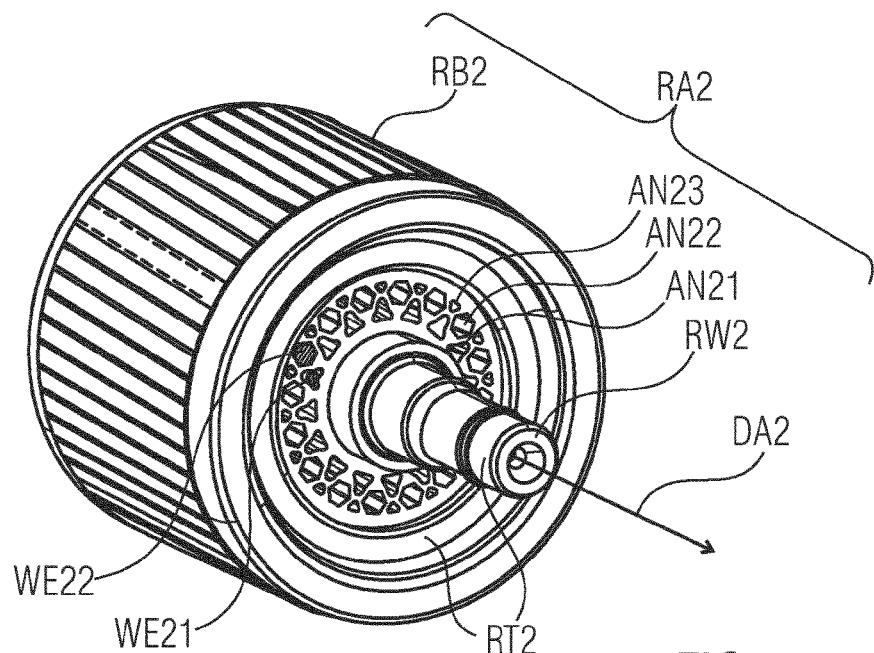
FIG. 5 shows a schematic perspective illustration of a rotor assembly according to a second embodiment of the invention, obliquely with respect to the rotational axis of the rotor assembly.
Figure 6:
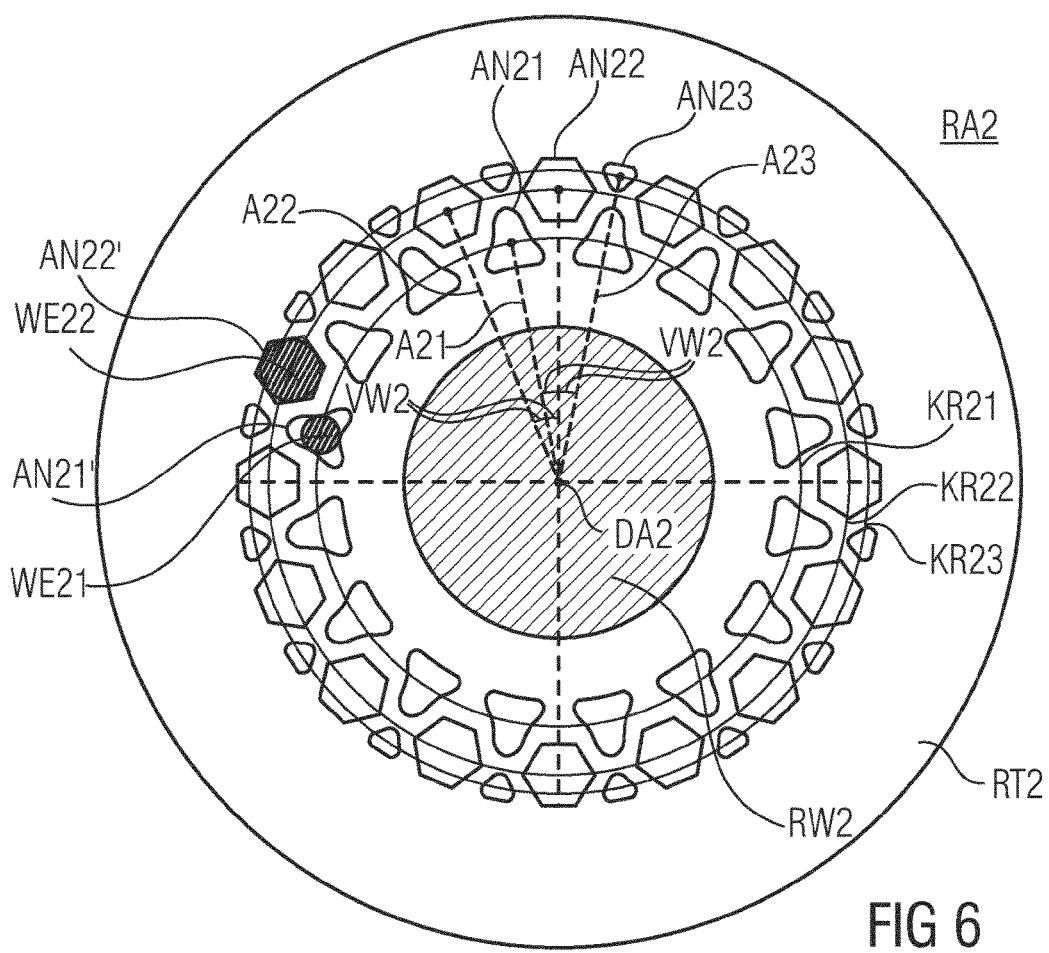
FIG. 6 shows a schematic illustration of a cross section of the rotor assembly according to the second embodiment of the invention.

After the rotor assembly RA1 according to the first embodiment of the invention has been described in detail with the aid of FIGS. 1 to 4, reference will now be made to FIGS. 5 and 6 which show a rotor assembly RA2 of an electric machine according to a second embodiment of the invention in a schematic perspective illustration, obliquely with respect to the rotational axis DA2 of the rotor assembly RA2 and in a cross section perpendicular to the rotational axis DA2 of the rotor assembly RA2.

Accordingly, the rotor assembly RA2 has a rotor RT2 and two balancing elements WE21 and WE22. The rotor RT2 comprises a rotor laminated stack RB2 and a rotor shaft RW2 which is connected fixedly in terms of rotation to the rotor laminated stack RB2. During operation, the rotor RT2 rotates about a rotational axis DA2, which extends centrally through the rotor shaft RW2 in the axial direction of the rotor shaft RW2.

The rotor laminated stack RB2 has a plurality of cutouts AN21, AN22 and AN23 which are distributed uniformly on the rotor laminated stack RB2 about the rotor shaft RW2 and are formed so as to extend parallel to the rotational axis DA2.

In this context, these cutouts AN21, AN22 and AN23 are divided into three groups depending on their cross-sectional shape and their distance from the rotational axis DA2. The first cutouts AN21 therefore form, with a respectively identical, triangular cross-sectional shape with a comparatively large area, a first group of cutouts AN21, wherein the cutouts AN21 of this first group are arranged radially spaced apart from the geometric center of gravity of the respective cutouts AN21 with a first and identical radial distance A21 from the rotational axis DA2 of the rotor RT2. The first group of cutouts AN21, or the geometric centers of gravity thereof, therefore lie on a first virtual circle K21. The second cutouts AN22 with a respectively identical, hexagonal cross-sectional shape form a second group of cutouts AN22, wherein the cutouts AN22 of this second group are radially spaced apart from the geometric center of gravity of the respective cutouts AN22 with a second and identical radial distance A22 from the rotational axis DA2. The second group of cutouts AN22, or the geometric centers of gravity thereof, therefore lie on a second virtual circle K22. The third cutouts AN23 with a respectively identical, triangular cross-sectional shape with a comparatively small area form a third group of cutouts AN23, wherein the cutouts AN23 of this third group are arranged radially spaced apart from the geometric center of gravity of the respective cutouts AN23 with a third and identical radial distance A23 from the rotational axis DA2. The third group of cutouts AN23, or the geometric centers of gravity thereof, therefore form a third virtual circle K23. Therefore, the cutouts AN21, AN22 and AN23 have cross-sectional shapes and cross-sectional surfaces which are the same as those in the respective same group but different from those of the respective other groups. In addition, the cutouts AN21, AN22 and AN23 of the rotor assembly RA2 of the second embodiment are, in contrast to the rotor assembly RA1, illustrated in FIGS. 1 to 4, of the first embodiment, located at different radial distances A21, A22 and A23 from the rotational axis DA2. Furthermore, the cutouts AN21, AN22 and AN23 of different groups are arranged with a partial radial angle offset from one another. The geometric centers of gravity of two different cutouts AN21 and AN22, arranged one next to the other, of the first and of the second groups, or AN22 and AN23 of the second and third groups, therefore have offset angles VW2 which are the same as one another with respect to a rotation about the rotational axis DA2 of the rotor assembly RA2. In contrast, the geometric centers of gravity of two different cutouts AN21 and AN23 of the first and third groups lie on the same line, extending radially from the rotational axis DA2. In summary, the cutouts AN21, AN22 and AN23 are arranged offset, both radially and tangentially in the rotational direction, from the rotational axis DA2 of the rotor assembly RA2 with respect to one another. Such an embodiment has the advantage that an unbalance of the rotor RT2 can be balanced even more finely by arranging balancing elements WE21, WE22 of different masses in the different cutouts AN21, AN22, AN23 at different radial distances A21, A22, A23 from the rotational axis DA2. Such an offset arrangement of the cutouts AN21, AN22, AN23 of the rotor assembly RA2 therefore provides better results during the compensation for the unbalance of the rotor RT2.

In two of the cutouts AN21 and AN22, specifically AN21' and AN22', in order to compensate for the unbalance of the rotor RT2 in each case a balancing element WE21 and WE22 is pressed in fixedly in terms of movement. In this context, the cylindrical balancing elements WE21 and WE22 each have a circular cross-sectional surface with a radius which is a little, advantageously by one to several millimeters, larger than the radius of the cross-sectional surface of the respective cutouts AN21', AN22', with the result that when the balancing elements WE21, WE22 are pressed in to the respective cutouts AN21', AN22', the balancing elements WE21, WE22 deform elastically or elastoplastically and therefore stable frictionally locking press fitting connections PV come about at the locations of the line contact between the balancing elements WE21, WE22 and the respective cutouts AN21', AN22', which hold the balancing elements WE21, WE22 fixedly in terms of movement in the respective cutouts AN21', AN22'.

Figure 7:
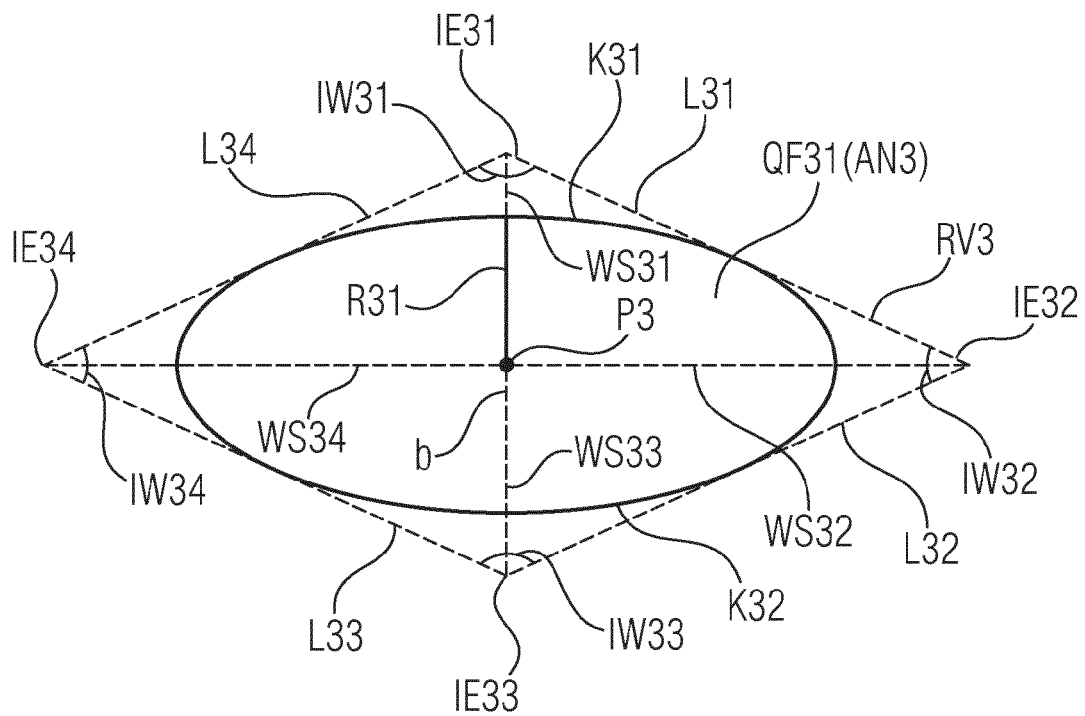
FIG. 7 shows a schematic illustration of a cross section of a cutout of a variant, perpendicularly with respect to the rotational axis of the rotor assembly.
Figure 8:
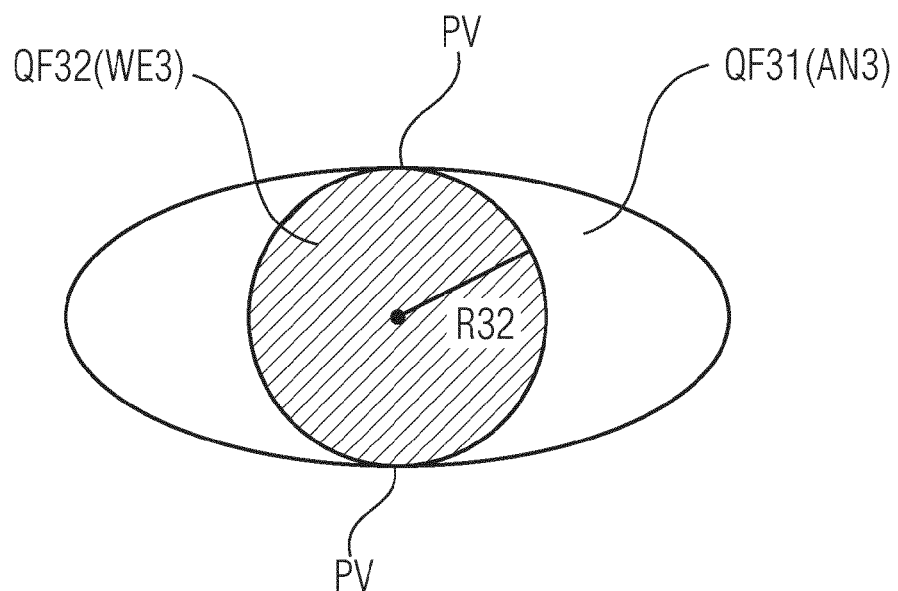
FIG. 8 shows a schematic illustration of a cross section of the cutout according to FIG. 7 with a pressed-in balancing element, perpendicularly with respect to the rotational axis of the rotor assembly.

Reference will now be made to FIGS. 7 and 8 which show schematically a cross-sectional surface QF31 of a cutout AN3 of an alternative variant for one of the rotor assemblies RA1, RA2 described above, with or without a pressed-in balancing element WE3.

In this context, FIG. 7 shows a cross-sectional surface QF31 of the cutout AN3 without a balancing element perpendicularly with respect to the rotational axis DA1 or DA2 of the rotor assembly RA1 or RA2. Accordingly, the cross-sectional area QF31 is defined by two similar arcuate curves K31 and K32 and has the shape of an ellipse, wherein four ellipsoidal tangential lines L31, L32, L33 and L34 which are of the same length and which are tangentially in contact with the ellipsoidal curve K31 and K32 and intersect one another in pairs form a rhombus-shaped quadrilateral RV3. The ellipsoidal cross-sectional area QF31 of the cutout AN3 therefore forms an in-ellipse of this rhombus-shaped quadrilateral RV3 (similarly to the principle of an in-circle of a quadrilateral).

The rhombus-shaped quadrilateral RV3 has four internal corners IE31, IE32, IE33 and IE34, each with an internal angle IW31, IW32, IW33 and IW34. The four angle lines of symmetry WS31, WS32, WS33 and WS34 of these four internal angles IE31, IE32, IE33 and IE34 intersect at a point P3, which is at the same time the geometric center of gravity of the cross-sectional surface QF31. The two curves K31 and K32, or ellipsoidal tangential lines L31, L32, L33 and L34 of these two curves K31 and K32, therefore connect two of the internal corners IE32, IE34 to one another. The shortest distance from this center of gravity P3 to the respective curves K31 and K32 has a length of half the small semi-axis b of the ellipsoidal cross-sectional surface QF31. This shortest distance is referred to below as the small radius R31 of the ellipsoidal cross-sectional surface QF31.

In order to compensate for the unbalance of the rotor assembly, balancing elements WE3 are pressed in accordance with the unbalance in one or more of the cutouts AN3. As is shown by FIG. 8, the cylindrical balancing element WE3 has a circular cross-sectional surface QF32 with a radius of R32, wherein the radius R32 of the cross-sectional surface QF32 of the balancing element WE3 is slightly larger, advantageously by one to several millimeters, than the small radius R31 of the cross-sectional surface QF31 of the cutout AN3, with the result that when the balancing element WE3 is pressed into the cutout AN3, the balancing element WE3 deforms elastically or elastoplastically and therefore stable frictionally locking press fitting connections PV come about at the locations of the line contact or surface contact between the balancing element WE3 and the cutout AN3, which line contact or surface contact holds the balancing element WE3 fixedly in terms of movement in the cutout AN3.

Figure 9:
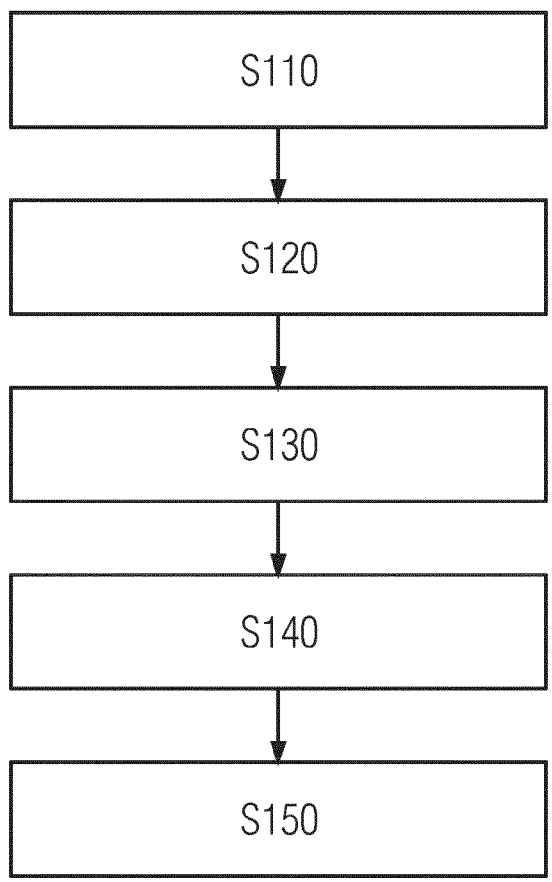
FIG. 9 shows a flowchart illustrating a production method for a rotor assembly according to one embodiment of the invention.

After the three exemplary embodiments of the rotor assembly have been described in detail with the aid of FIGS. 1 to 8, reference will now be made to FIG. 9 in which an exemplary embodiment for producing a rotor assembly RA1, illustrated in FIGS. 1 to 4, is illustrated schematically in a flowchart.

Firstly, according to a first method step S110 a plurality of similar sheet-metal disks RS1, each with a geometric center of gravity SP1 as the center point, are made available, wherein the rotational axis DA1 of the rotor assembly RA1 passes through this center of gravity SP1 after the rotor assembly RA1 has been assembled. These sheet-metal disks RS1 can, for example, be produced by punching out from a thin metal plate.

During the punching out of the sheet-metal disks RS1, in each case a circular hole with the center of gravity SP1 of the respective sheet-metal disk RS1 can advantageously be punched out at the same time, as the center of a circle. After the sheet-metal disk RS1 have been fitted together to form the rotor laminated stack RB1 the holes form a continuous cutout for receiving and for attaching a rotor shaft RW1.

According to a second method step S120, at least one or more holes are punched out radially spaced apart from the center of gravity SP1 or from the circular hole with the center of gravity SP1 as the center of a circle, on at least one sheet-metal disk RS1 or on a plurality of the sheet-metal disks RS1.

Subsequently, according to a third method step S130 the sheet-metal disks RS1 are fitted together congruently to form a rotor laminated stack RB1 in such a way that cutouts AN11, AN12 for receiving balancing elements WE1 are formed on the rotor laminated stack RB1 by the respective holes in the sheet-metal disks RS1.

Then, according to a fourth method step S140, a rotor shaft RW1 is introduced in the hole of the rotor laminated stack RB1 and secured fixedly in terms of rotation to the rotor laminated stack RB1, with the result that a rotor shaft-rotor laminated stack structure is formed.

If the rotor shaft-rotor laminated stack structure has an unbalance in the rotation about the rotational axis DA1, this is compensated for using one or more balancing elements WE1. In order to compensate for the unbalance of the rotor shaft-rotor laminated stack structure, according to a subsequent method step S150 one or more balancing elements WE1 are pressed into the corresponding cutouts AN11 in a press fitting method in accordance with the position and severity of the unbalance, with the result that press fitting connections are formed between the respective cutouts AN11 and the corresponding balancing elements WE1, as a result of which the balancing elements WE1 are secured fixedly in terms of movement by the cutouts AN11.

LIST OF REFERENCE SYMBOLS

EM Electric machine
GT Housing part
ST Stator
RA1, RA2 Rotor assembly
RT1, RT2 Rotor
RW1, RW2 Rotor shaft
RB1, RB2 Rotor laminated stack
LS1, LS2 End plate DA1, DA2 Rotational axis
RS1 Rotor sheet-metal disk
AN11, AN12, AN21, AN22, AN23, AN21', AN22', AN3 Cutout
WE1, WE21, WE22, WE3 Balancing element
VW1, VW2 Offset angle between two adjacent cutouts
SP1 Center of gravity of a rotor sheet-metal disk
AS1 Cutout on a rotor sheet-metal disk
A1, A21, A22, A23 Radial distance of the cutouts from the rotational axis
KR1, KR21, K22, KR23 Virtual circle on which the cutouts lie
QF11, QF31 Cross-sectional surface of a cutout
QF12, QF32 Cross-sectional surface of a balancing element
ER1 Corner rounded portion of a cross-sectional surface of a cutout
S11, S12, S13 Side of a cross-sectional surface of a cutout
IE11, IE12, IE13, IE31, IE32, IE33, IE34 Internal corner of a cross-sectional surface of a cutout
IW11, IW12, IW13, IW31, IW32, IW33, IW34 Internal angle of the internal corner of the cross-sectional surface of a cutout
WS11, WS12, WS13, WS31, WS32, WS33, WS34 Angle line of symmetry of the internal angles
L31, L32, L33, L34 Ellipsoidal tangential lines of a cross-sectional surface of a cutout
P1, P3 Geometric center of gravity of a cross-sectional surface of a cutout
IK1 Virtual in-circle of a cross-sectional surface of a cutout
R11 Radius of the virtual in-circle of a cross-sectional surface of a cutout
b Small semi-axis of a cross-sectional surface
R31 Small radius of a cross-sectional surface of a cutout
R12, R32 Radius of a cross-sectional surface of a balancing element
PV Press fitting connection
K31, K32 Arcuate curve
RV3 Rhombus-shaped quadrilateral

What is claimed is:

1. A rotor assembly for an electric machine, the rotor assembly comprising:
a rotor having a rotational axis extending in an axial direction of the rotor,
a first array of first cutouts extending parallel to the rotational axis and arranged radially spaced apart from the rotational axis by a first radial distance,
a second array of second cutouts extending parallel to the rotational axis and arranged radially spaced apart from the rotational axis by a second radial distance,
wherein the first cutouts have a first cross-section with a first geometric center located at the first radial distance,
the second cutouts have a second cross-section and a second geometric center located at the second radial distance,
the first cross-section and the second cross-section are not the same shape when viewed from a perspective of the rotational axis, and
a first balancing element that compensates for an unbalance of the rotor during rotation about the rotational axis,
wherein the first balancing element is attachable in one of the first cutouts by a press fitting connection between the one of the first cutouts and the first balancing element,
and a second balancing element attachable in one of the second cutouts by a press fitting connection between the one of the second cutouts and the second balancing element.

2. The rotor assembly of claim 1, wherein the first cutouts and the second cutouts are arranged with a radial angle offset in relation to one another in the rotational direction with respect to the rotational axis.

3. The rotor assembly of claim 1, wherein the first cross-section or the second cross-section have a surface with a geometry having at least two internal corners, each with an internal angle, wherein angle lines of symmetry of all the internal angles intersect at a point.

4. The rotor assembly of claim 3, wherein the surface has a geometry defining a polygon with at least three sides and at least three internal corners, each with an internal angle.

5. The rotor assembly of claim 4, wherein the surface has a geometry defining a polygon with equally long sides and equally large internal angles.

6. The rotor assembly of claim 3, wherein the surface has a geometry defining at least two arcuate curves which connect the internal corners to one another.

7. The rotor assembly of claim 3, wherein the surface has on at least one of the internal corners a corner rounded portion for reducing the notch stress at the at least one first cutout and/or the at least one second cutout.

8. The rotor assembly of claim 1, further comprising a rotor laminated stack comprising a plurality of punched rotor sheet-metal disks, wherein at least one rotor sheet-metal disk includes punched holes the first array of first cutouts.

9. A method for producing a rotor assembly, the method comprising:
providing a plurality of similar sheet-metal disks, each having a center of gravity;
in at least one of the sheet-metal disks, cutting out a set of first holes spaced radially apart from the center of gravity of the respective sheet-metal disk at a first radial distance;
cutting out a set of second holes spaced radially apart from the center of gravity of the respective sheet-metal disk at a second radial distance; and
assembling the plurality of sheet-metal disks to form a rotor such that the set of first holes and the set of second holes define a first array and a second array, respectively, of cutouts configured for (a) receiving a balancing element that compensates for an unbalance of the rotor and (b) attaching the balancing element by a press fitting connection between at least one of the cutouts and the first balancing element;
wherein the first holes and the second holes have respective cross-sections of different shapes when viewed from a perspective of the center of gravity.

10. The method of claim 9, further comprising pressing at least one balancing element into at least one cutout to compensate for the unbalance of the rotor such that a press fitting connection is created between the at least one cutout and the at least one balancing element.

11. An electric machine, comprising:
a rotor assembly comprising:
a rotor having a rotational axis extending in an axial direction of the rotor,
a first array of first cutouts extending parallel to the rotational axis and arranged radially spaced apart from the rotational axis by a first radial distance, a second array of second cutouts extending parallel to the rotational axis and arranged radially spaced apart from the rotational axis by a second radial distance, wherein the first cutouts have a first cross-section with a first geometric center located at the first radial distance, the second cutouts have a second cross-section and a second geometric center located at the second radial distance, the first cross-section and the second cross-section are not the same shape when viewed from the rotational axis, and a first balancing element that compensates for an unbalance of the rotor during rotation about the rotational axis, wherein the first balancing element is attachable in one of the first cutouts by a press fitting connection between the one of the first cutouts and the first balancing element, and a second balancing element attachable in one of the second cutouts by a press fitting connection between the one of the second cutouts and the second balancing element.

12. The electric machine of claim 11, wherein the first cutouts and the second cutouts are arranged with a radial angle offset in relation to one another in the rotational direction with respect to the rotational axis.

13. The electric machine of claim 11, wherein the first cutouts or the second cutouts have a surface that comprises a geometry having at least two internal corners, each with an internal angle, wherein angle lines of symmetry of all the internal angles intersect at a point.

14. The electric machine of claim 13, wherein the surface has a geometry defining a polygon with at least three sides and at least three internal corners, each with an internal angle.

15. The electric machine of claim 14, wherein the surface has a geometry defining a polygon with equally long sides and equally large internal angles.

16. The electric machine of claim 13, wherein the surface has a geometry defining at least two arcuate curves which connect the internal corners to one another.

17. The electric machine of claim 13, wherein the surface has on at least one of the internal corners a corner rounded portion for reducing the notch stress at the at least one first cutout and/or the at least one second cutout.

* * * * *